United States Patent [19]

Verdone

[11] Patent Number: 4,644,641

[45] Date of Patent: Feb. 24, 1987

[54] FABRICATION OF "DELTA" MAGNETIC HEAD-SLIDERS

[75] Inventor: Michael A. Verdone, Hillsborough, Calif.

[73] Assignee: Memorex Corporation, Santa Clara, Calif.

[21] Appl. No.: 814,824

[22] Filed: Dec. 30, 1985

[51] Int. Cl.$^4$ ............................................. G11B 5/60
[52] U.S. Cl. ...................................... 29/603; 360/103
[58] Field of Search ................. 29/603, 415; 360/102, 360/103, 122

[56] References Cited

U.S. PATENT DOCUMENTS 1,931,234 10/1933 Moseley ................................. 29/415
3,441,999 5/1969 Perdue et al. ......................... 29/415

FOREIGN PATENT DOCUMENTS 5612 1/1978 Japan ................................... 360/103

Primary Examiner—Lowell A. Larson
Attorney, Agent, or Firm—John J. McCormack; Nathan Cass; David W. Heid

[57] ABSTRACT

Described are Delta-shaped magnetic recording "sliders", some being provided with a "back-bar" and associate "purge channel", the air bearing surface area of the sliders increasing gradually from a minimum at its nose to a maximum at its trailing edge.

10 Claims, 24 Drawing Figures

FIG. 3.
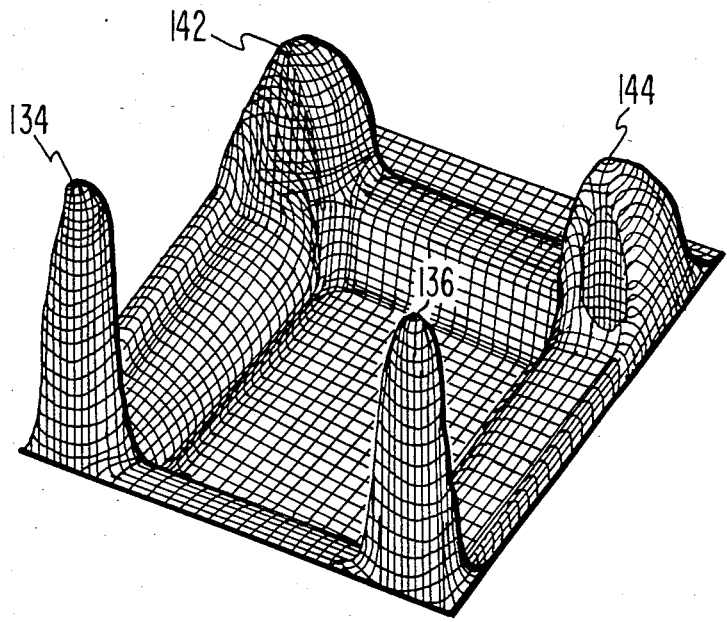
FIG. 9.
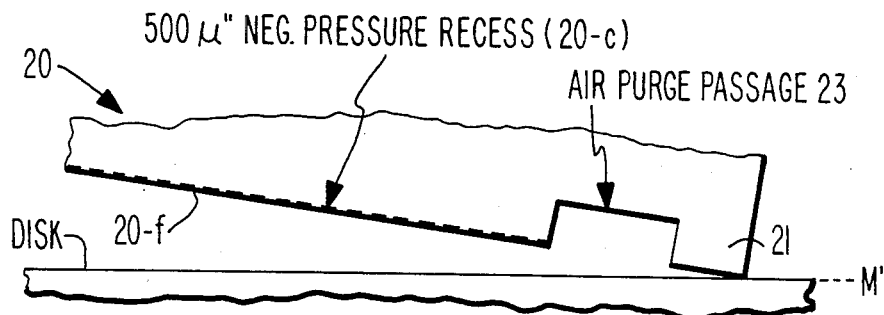
FIG. 10. SELFLOAD SLIDER.
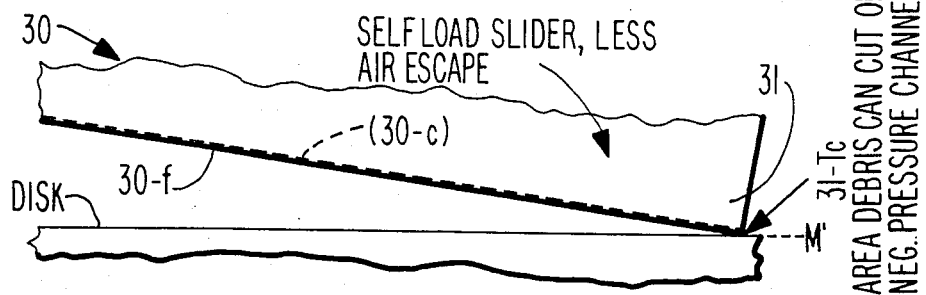

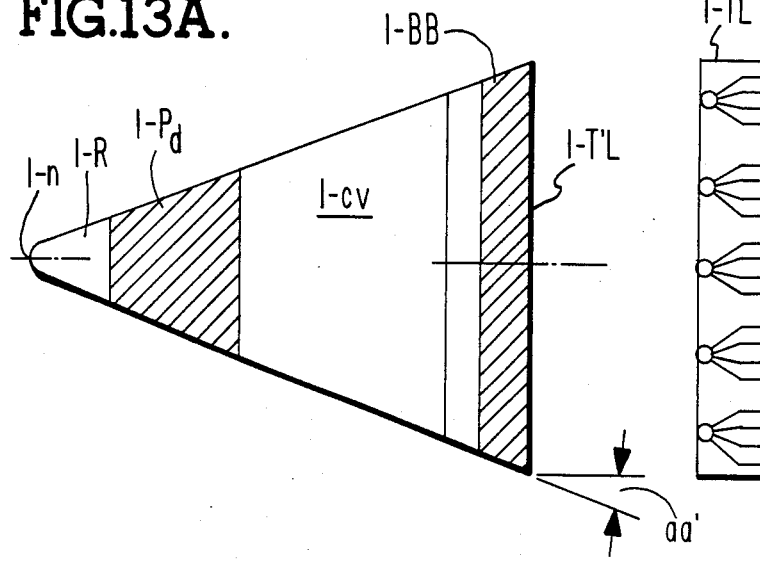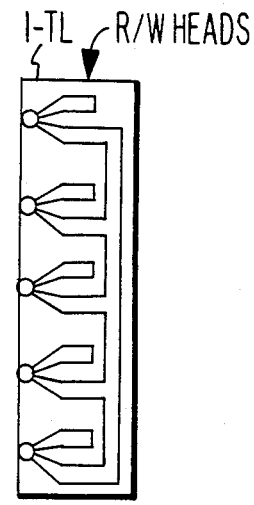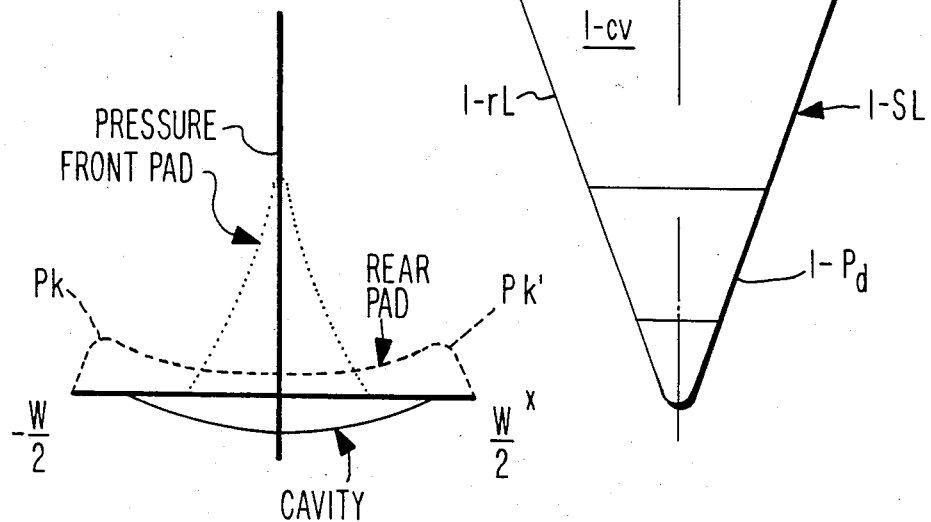
FIG. 13A.
FIG. 13B.
FIG. 14A.
PRESSURE PROFILES FOR SLIDER AIR BEARING
FIG. 14B.

FABRICATION OF "DELTA" MAGNETIC HEAD-SLIDERS

A "Delta slider" for flying a magnetic head on a fluid bearing above moving magnetic recording media is disclosed in which an air bearing surface ABS includes a generally planar, but divergent, fluid support surface extending generally transverse to the direction MM of media movement, with ABS area increasing in direction MM. The leading-edge of this ABS is relatively narrow and pointed. A method of making such a Delta slider is also disclosed.

The present invention relates to magnetic head-slider assemblies, and more particularly to air bearing slider assemblies used for noncontact recording in magnetic disk files and the like.

PRIOR ART, INVENTION FEATURES

Magnetic head assemblies, comprising sliders carrying magnetic transducers, are widely and extensively used in magnetic recording apparatus, particularly disk recording apparatus. Various types of head/slider arrangements that fly on a fluid or air bearing film over the moving recording media surface are well known in the art. In order to maximize the density of stored data on such magnetic disks, the flying height of the transducer above the media is made as small as is practical, with the requirement that a substantially constant height be maintained. Conventionally, the sliders are designed such that they experience, from their support arms, a constant pressure toward the disk surface, with the lifting force of the air bearing serving to hold the slider and transducer away from the disk surface the desired amount when the disk is rotating.

An object of this invention is to provide a novel and improved air bearing slider for a flying magnetic head assembly that maintains a substantially constant spacing relative to a moving magnetic medium during transducing operation.

Another object is to provide a head slider assembly that is insensitive to skew and disk curvature or flutter and has a high degree of bearing stiffness and stability.

Magnetic head assemblies that fly relative to magnetic media have been used extensively. The objectives for improving the noncontact transducing relationship between a magnetic transducer and a magnetic recording medium, such as a rotary disk, are to attain very close spacing between the transducer and the disk, and to maintain a stable constant spacing. The close spacing, when used with very narrow transducing gaps and very thin magnetic record films, allows short wavelength, high frequency signals to be recorded, thereby affording high density, high storage capacity recording. As the data recording technology progresses, it becomes more desirable to fly magnetic heads more closely to the magnetic disk surface in order to increase data packing density.

Workers are aware of prior art techniques to utilize magnetic head-slider assemblies. In such an air bearing slider assembly, magnetic transducers are affixed thereto for non-contact recording on a passing magnetic disk. Workers know how to mount such magnetic head assemblies (having air bearing sliders) onto carriages—e.g., to be used in integrated data modules for storage of information in a magnetic disk file.

Efforts now abound to increase the density of storage on such magnetic disks—e.g., workers are trying to narrow disk-track width.

Among the various types of known slider configurations are those of Garnier, et al. U.S. Pat. No. 3,855,625 (self-loading), Roscamp, et al. U.S. Pat. No. 4,081,846 and the trimaran structures of Warner U.S. Pat No. 3,823,416 and Piper, et al. U.S. Pat. No. 3,754,104, where the transducing head is supported relative to a record medium by three pads spaced apart from one another in triangular formation.

One type of slider which has been developed and which may possess some self-loading characteristic is that shown in the Garnier, et al. patent. This slider, having what is known as a taper-flat configuration with a ramped portion at the leading edge and two air bearing rails extending therefrom to the trailing edge with a rectangular recess therebetween, has provided satisfactory operation in many respects. The structure is substantially self-loading in that the rectangular recess provides a low pressure area to counteract some of the lift provided by the air bearing side rails such that the device tends to fly a distance above the moving media surface which can be controlled by the relationship between the rectangular recess and the fluid bearing rails. However, the Garnier, et al. structure possesses several major disadvantages both in fabrication and in operation. Since the recessed area of that structure is rectangular and is enclosed on three sides by walls, fabrication of the device requires surface etching to produce the necessary configuration. The requirement for such etching severely restricts the types of material that may be used. And, the edges are substantially perpendicular to the air bearing surface and act as collectors of dust, debris and foreign material. A build-up of such material in this cavity can change the operating conditions of the slider and head assembly significantly.

Even the slider configurations of Roscamp, et al. and Warner require expensive processes such as grinding and lapping within confined areas between side rails. Such requirements not only increase the manufacturing costs but also may have adverse effects upon the production yield.

Illustrated in FIG. 1 is a prior art "self-loading" slider 20' of the conventional, taper-flat configuration with ramps 22' leading into air bearing support side rails 24' which run the length of the slider. At the leading edge of the slider a cross rail 26' (emphasizes negative pressure and self-loading of cavity 30') extends between the two side rails 24'. Suitable magnetic transducers 28', schematically illustrated in phantom, are provided at the trailing edge of the transducer.

In this prior art slider 20' the flying height is controlled by the provision of a rectangular negativepressure cavity 30' bounded on three sides by the side rails 24' and the cross rail 26'. This cavity 30' is generally formed by various etching techniques, is disadvantageous in that the manufacturing processes form side walls 32' and 34' between the base of the cavity 30' and the side rails 24' and transverse rail 26', which side walls are generally perpendicular to the surfaces of the side rail and transverse rail. The abrupt break between the fluid bearing support surfaces and the side walls, as well as the corners at the leading edge of the recess 30' have tended to trap dust and debris and to make continued control of the flying height difficult. As noted above, the necessity for forming such a structure by etching has also limited the materials from which the slider could be fabricated and has complicated the manufacturing process.

The present invention provides a "Delta slider" which overcomes many of the disadvantages of the prior art devices. It is an object of this invention to provide a novel Delta slider for flying a magnetic head at a substantially constant spacing from the moving magnetic media during operation.

It is another object of this invention to provide a Delta slider which resists roll.

A further object is to provide such a slider which is easy and economical to manufacture.

To achieve the foregoing, as well as other objects which will become apparent below, the present invention provides a Delta-shaped slider ABS for flying a magnetic head on a fluid bearing relative to magnetic recording media moving in a predetermined direction, which slider includes a slider ABS whose area increases as one proceeds fore-to-aft.

FIG. 2 shows an air bearing head slider formed from a substantially rectangular block 110 made of ceramic, by way of example. The slider may be configured with an air bearing surface that is flat, taper-flat, or other variations of geometry. The slider configuration has two spaced side rails 112 and 114 and a cross-rail 16. The leading portion of each rail 112 or 114, relative to a moving data track, is formed as tapered sections 118 and 120 respectively. Between the tapered sections and at the leading end of the slider adjacent to the cross rail 16, a recessed step 119 is configured.

Magnetic transducer elements 122a, 122b, which may be thin film assemblies, are bonded to the ends of the rails 112 and 114 at the trailing end 113 of the slider relative to the path of movement of the data tracks as found for example on a rotating magnetic disk (not shown). The transducing gaps of the elements 122a,b are flush with the surface of the side rails 112 and 114. The slider assembly, when it is urged by a load means toward the surface of a rotating magnetic disk, establishes a thin air lubricating film which separates the gaps of the transducer elements from the disk by a very small, but constant distance.

A negative pressure zone 24 is formed by the configuration of the side rails and cross-rail. The negative pressure zone is made in the recessed region following the cross-rail 116 and between the two side rails 112 and 114 to the same depth as the step 119, which may be in the order of 10 microns.

To provide optimum opposing load forces, and to realize mechanical stability with insensitivity to skew and disk curvature or flutter while preserving high stiffness, reliefs or recessed areas 126 and 128 may be formed on the exposed surfaces of the side rails and at the air bearing surface of the slider. The recesses 126 and 128 are formed, by etching for example, to a depth in the side rails which produces a condition of essentially ambient or slightly subambient pressure across the side rails in the recess areas 126, 128 during flying operation of the head slider. The recesses 126, 128 are preferably formed to a depth in the range of 0.5 to 3 microns. The cross-rail 116 may also be relieved to the same depth as the recesses below the surface of the side rails, during the same fabrication step.

FIG. 3 depicts a trailing edge isometric view of the pressure profile observed with the implementation of the inventive slider described with reference to FIG. 2. For reference, the outer slider boundaries are at ambient pressure. The zones between the pressure peaks (136 and 144, and 134 and 142) have average pressures essentially equal to ambient, and relate to the side rail relieved zones 126 and 128 respectively. The two projecting positive pressure areas 134 and 136 relate generally to the trailing end surfaces 138 and 140 of the side rails 112 and 114, respectively, and the positive pressure areas 142 and 144 relate to the front portions 146 and 148 respectively of the side rails. This illustrates "4-point" slider-record contact (see also U.S. Pat. No. 4,218,715).

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawings (not necessarily to scale), wherein like reference symbols denote like elements.

FIG. 9 schematically indicates operational attitude (side view) of such an embodiment, while FIG. 10 indicates the same without a back-bar;

DESCRIPTION OF BACK-BAR; FEATURE

Figure 4:
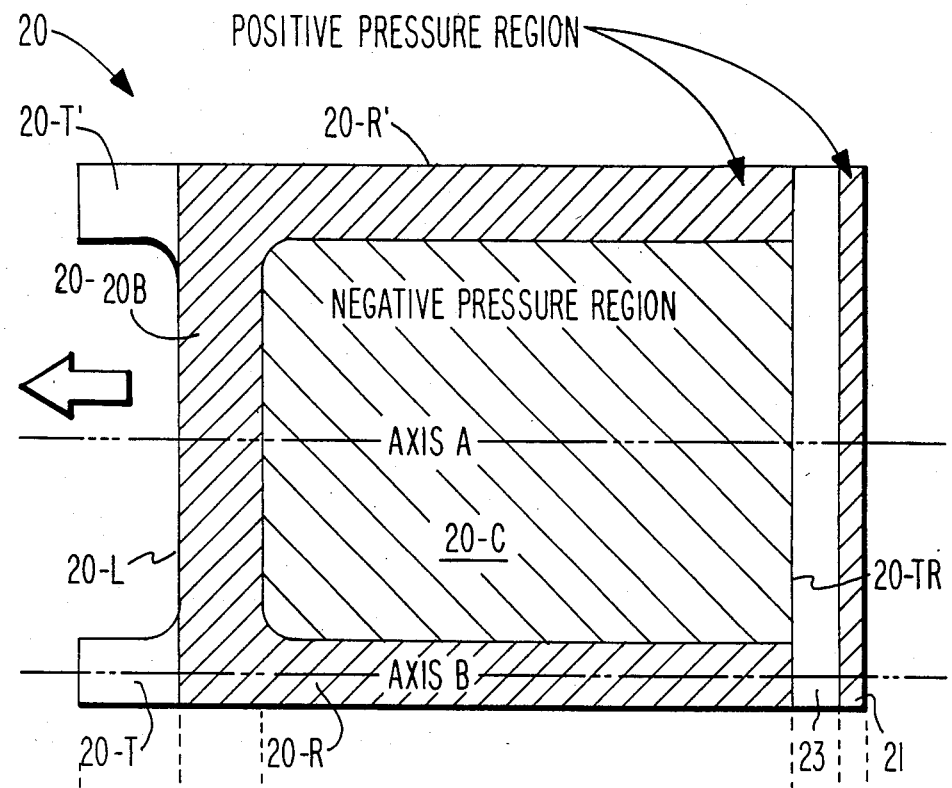
FIG. 4 depicts in plan view a like self-loading slider, shown in side and end views respectively in FIGS. 5, 6, with different pressure profiles thereof given in FIGS. 7 and 8, these being idealized pressure-profiles along respective axes of this slider.
Figure 5:
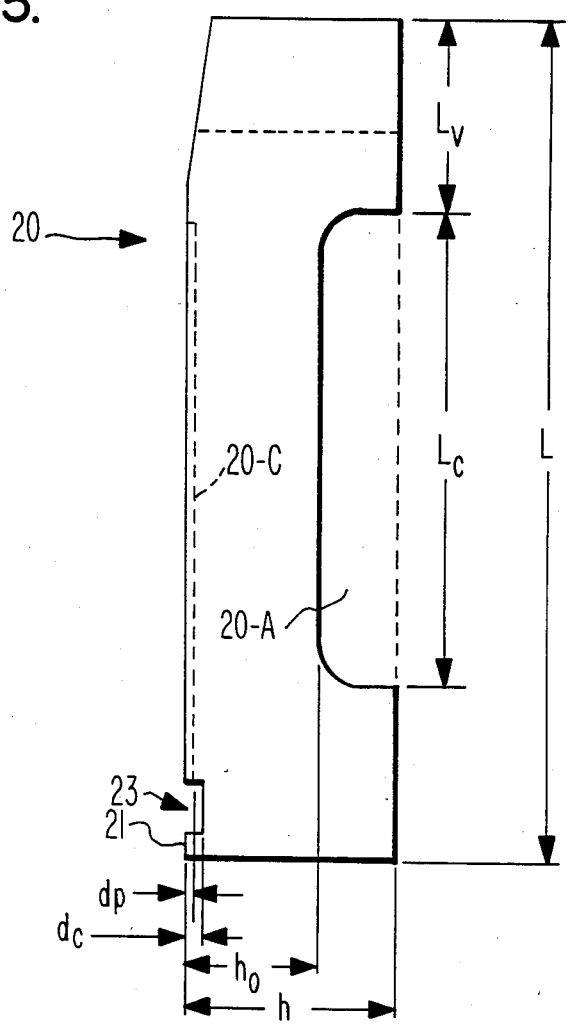
Figure 6:
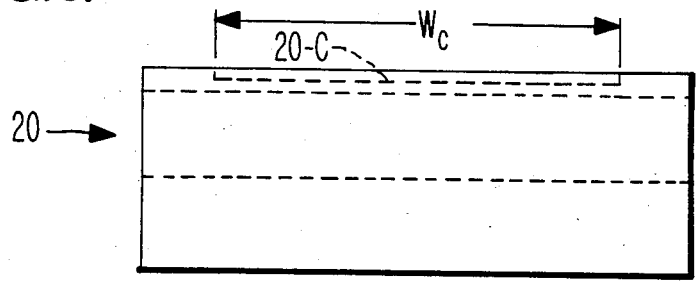

FIGS. 4-6 schematically illustrate a "self-loading" type slider assembly 20 constructed and modified according to a back-bar feature. This, and other related techniques and means discussed for all embodiments, will generally be understood as constructed and operating as presently known in the art, except where otherwise specified. And, except as otherwise specified, all materials, methods and devices and apparatus herein will be understood as implemented by known expedients according to present good practice.

More particularly, FIGS. 4-6 will be understood as schematically depicting such a slider 20 which is improved to include a prescribed "full back bar" 21 and associated "purge channel" 23 extending transverse to the direction of slider flight (arrow). Slider 20 will be recognized by workers as otherwise conventional, comprising a ceramic body 1 with a leading edge portion 20-L and a trailing edge portion 20-TR, a pair of (positive-pressure) side-rails 20-R, 20-R' (including projecting, ramped lead-tips 20-T, 20-T'), plus a very shallow interior aerodynamic cavity 20-C (or "negative-pressure channel") of prescribed precise dimensions (usually, up to several hundred $\mu$-in.).

It has been found that advantageous effects may be produced by a prescribed extension of the slider length to accommodate a "back-bar" 21 and intervening "purge channel" 23 of proper dimensions, designed to reduce the pressure to zero (atmosphere)—and yield such effects as flushing the dirt particles away from the transducer end. Workers know that one must guard against detritus clogging slots P, R or cavity L (e.g., this can lead to a catastrophic head crash). Now, some detritus build-up is virtually certain with such sliders. For instance, the best filters ["99.999%" type] correctly used with such equipment will customarily exclude all atmospheric contaminants larger than about $12\mu''$. This should eliminate most smoke particles (usually $\sim 250\mu''$). But smaller airborne contaminants abound and can readily build-up in shallow cavity L (especially at its trailing edge) and/or in slots P, R [e.g., commonly: oil vapor from the disk drive bearings, particles from the media—also smog, atmospheric dust and fumes, rosin smoke, metallurgical dust and fumes, viruses, etc.]. Thus, the art needs a better contaminant-free slider which avoids, or mitigates, such problems. This is one salient objective of my invention.

Thus, as one feature hereof, an improved, more contaminant-free flying slider is provided with a "back-bar" and associated transverse flush-cavity (purge channel) adapted to better accommodate multiple heads at the lowest point of slider's flying face (above disk), to reduce pitch angle, to better "flush" the slider (cf. more reliable way of keeping "negative-pressure-orifice" clean), to facilitate fabrication of thin film heads (lower cost, yet high reliability due to accuracy of masking techniques), and to effect improved "purging" (at the R/W gap).

In particular, this allows multiple transducer means to be located anywhere across the "back bar" (compared with conventional sliders). This "back bar" extends the full width of the slider (trailing edge)—i.e., to be a "full back bar" (no advantage to less than full width)—and it may be of any suitable width (along direction of axis A) depending on pitch angle required (e.g., here, several mils width was found suitable).

The "purge channel" 23 is cut just upstream (forward) of the back-bar 21 along the slider ABS face 20-f. Channel 23 will be located (along axis A) such as to terminate cavity L and to distribute positive and negative (dynamic) forces as understood by workers. Channel 23 may in some instances be cut in two segments. Channel 23 is preferably cross-sectionally rectangular (square-corners as in FIG. 5, e.g., for fabrication convenience) or virtually any other suitable shape.

For instance, satisfactory operation has been observed with a self-loading slider like slider 20 (FIGS. 4–6) about 170 mils in length L ($L_c$=93 mils) by 40 mils in height h ($h_c$=25 mils), by 110 mils in width w ($w_c$=80 mils); with rails having a width $w_r$ of about 15 mils [ramp $h_p$ about 0.175 mils in height $h_r$; tips 20-T about 20 mils in length, $t_e$—bar 20-L about 20 mils in length, $f_e$] with "flying-cavity" 20-c about 500 micro-inch in depth $d_c$ and 80 mils in width $w_c$.

For this slider, under relatively conventional "flying" conditions (e.g., disk surface-velocity at mid-track about 1500 inch/sec—3600 rpm 4"–7" disk band), it is found satisfactory to make "back bar" 21 about 5 mils wide ($w_b$) and "square" in cross-section (cf. FIG. 5) with a purge channel 23 about 10 mils wide ($w_p$) and about 4 mils deep ($d_p$) and "square-cut". This afforded a stable flying height of about 5–7 micro-inch (at trailing edge, along back-bar), and showed fine "self-flushing" characteristics—such that workers would likely be surprised.

Figure 7:
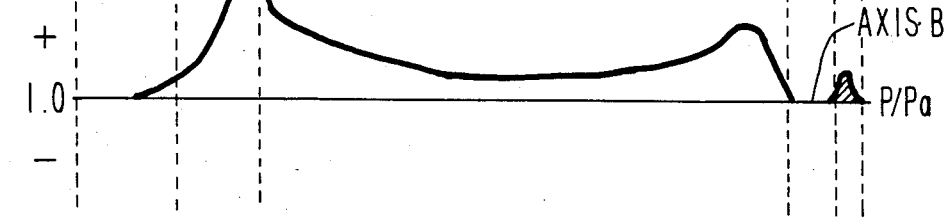
Figure 8:
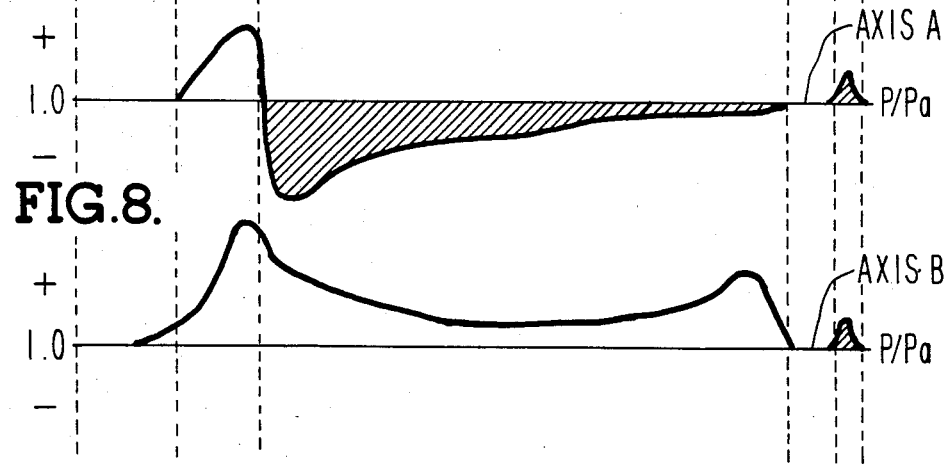

OPERATION OF THIS EMBODIMENT (see FIGS. 7, 8)

FIG. 9 diagrammatically suggests how such a slider 20 is intended to function, as opposed to a like slider 30 lacking the "back-bar" and "purge channel" (both sliders assumed to be flying above a disk at a desired attitude, for read/write operations). The trailing corner 31-Tc of conventional (self-load) slider 30 in FIG. 10 will be visualized as allowing relatively little air (compressed by slider flight) to escape, and will be seen as approaching so close ("trailing corner" 31-Tc of flying-face 30-f at trailing-edge 31) to the passing disk surface (see plane M'—M') as to readily be occluded by debris build-up—such as to "block" the desired, necessary purge of its "negative-pressure-channel" 30-c.

By comparison, when analogous embodiment 20 is provided with a back-bar 21 and associated purge channel 23 (see FIG. 9) to purge its "negative-pressure-channel" 20-c of debris, air can readily and quickly escape to atmosphere, so the slider 20 may purge itself of debris quite easily. [Note the relatively "massive" dimensions of purge-channel 23 compared with the miniscule depth of n-p channel 20-c]. Such "purging" along such a relatively massive channel (cut transverse to the flying direction) is found different from (and superior to) other proposed air escape configurations such as "parallel slots" through bar 20-B. This proposed design is not as practical or economical, etc., as I would like.

Thus, this "full back-bar/transverse purge channel" design improves operational and other characteristics of the usual "self-load" slider, giving a massive air purge conduit across to the air bearing surface (to very effectively flush cavity 20-c) and parallel to the back-bar. The "positive pressure" and the "negative pressure" regions provide the "net load" across the air bearing surface (compare FIGS. 7, 8 with FIG. 4). The positive pressure surfaces (along axis B; cf. FIG. 8) fully flank the medial negative pressure area (e.g., along axis A; cf. FIG. 7). The resultant (net, loading) force due to these pressures provides a relatively constant load over the slider bearing. Changes in air flow or disk speed will have negligible effect on this loading; hence, a more stable air bearing surface is realized.

The positive loads due to positive pressure distribution along the side rails and the "back-bar" control the "bearing stiffness" of the slider. The sum of these positive loads tends to increase the "net load", resulting in a higher air-bearing-stiffness (see FIGS. 7, 8 for pressure profiles plotted along axis A, axis B of slider of FIG. 4).

Workers will note that as cavity depth (cd) increases the flying height (fh) increases and becomes less linear vs load change—and tends to approach the characteristics of a more conventional slider OW (ordinary Winchester, no Back-Bar)—something novel in the art—also, suction decreases as cd increases. Thus, a worker would likely prefer a MIN cd design (e.g., $100\mu''$); however, for ease and reliability of rendering such miniscule "cd cuts", we prefer a cd of about $300\mu''$ (or slightly more).

The positive pressure distributed along the back-bar surface will increase slider stiffness. This added stiffness will tend to improve control of the slider and inhibit undesirable "roll" (e.g., about axis A, FIG. 4). The presence of such positive back-bar pressure also acts to reduce the "pitch restoring moment", and thus reduce "pitch angle" where pitch angle is plotted vs load for a "zero load full back bar" slider.

Workers will be surprised to note that, unlike the ordinary slider, such "back bar sliders" are so relatively insensitive to changes in load (especially the smaller cd, at least for such minor load changes). A like (surprisingly) insensitivity to disk-velocity is also observed (e.g., 1500–2500 ips).

INITIAL DELTA EMBODIMENT

Figure 11:
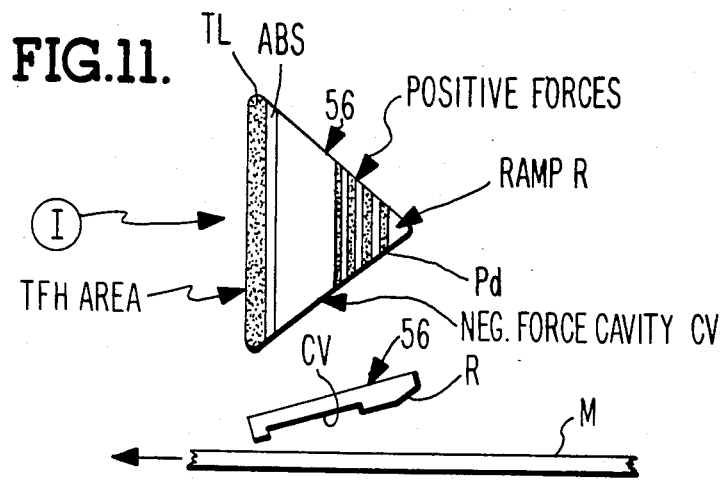
FIG. 11 is a highly-schematic, generalized view (plan, side) of a Delta slider with Back-bar.

FIG. 11 indicates some broad features of the subject "delta slider" here shown rather generally as delta slider SL depicted in pitched "flying condition" flying on an air bearing film past associated magnetic recording medium M. Slider SL will be understood as pitched-up by positive hydrodynamic forces on forward pad PD (situated just aft of ramp R) and supported elsewhere by the positive forces on tail section TL as well as some forces from the rail members 1-RL enclosing cavity CV—cavity CV acting as a negative pressure force as with the typical self-loading slider urging slider SL relatively toward passing medium M. A "Delta slider" will be understood as having a somewhat pointed (reduced width) nose with gradually increasing ABS area going aft therefrom. (The non-ABS parts of the slider need not follow this Delta-profile, though such is preferred).

TABLE A

As further detailed below, many desired characteristics inhere in this "delta slider", such as:

1. It provides a slider with a "three point force profile" and greater stability (less roll, etc; see discussion of FIG. 13 below).

Figure 1:
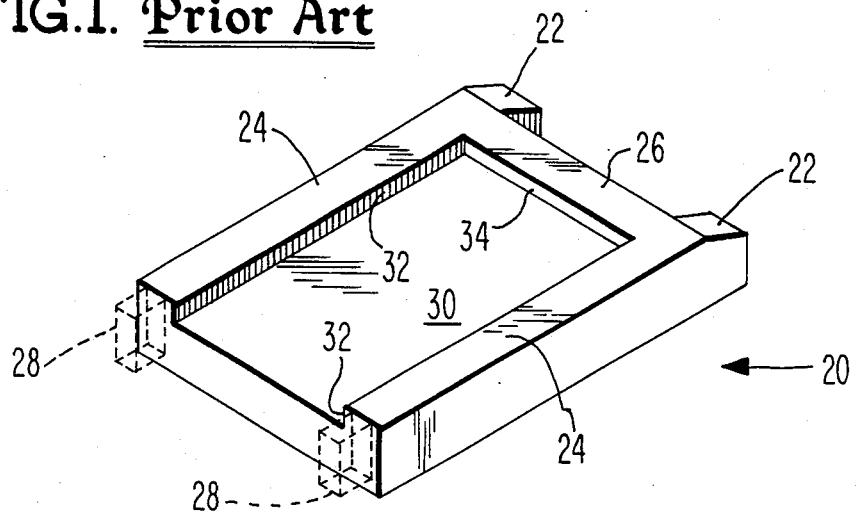
FIG. 1 depicts, in schematic perspective, a prior art self-loading ("modified Winchester") type slider while FIG. 2 similarly depicts a like known slider whose ABS pressure profile is given in FIG. 3.

2. The delta shape provides a maximum tail area for mounting read/write heads (as much as with the best conventional sliders), whereas the overall slider mass (weight) is radically reduced (about one-half of a conventional slider such as in FIG. 1 or in U.S. Pat. No. 3,855,625, etc.).

3. This great reduction in mass is accompanied by a significant decrease in production cost and an increase in the "natural frequency" of the slider—this latter acting to increase the servo band width associated with the head carriage (e.g., when mounted on the same load beam as slider of U.S. Pat. No. 3,855,625, the delta has a natural frequency 5% higher).

4. The delta design is particularly stable, especially laterally and is quite resistant to disturbance from surface asperities, being nimble in negotiating such, without problems.

5. Delta operation is particularly clean, even "self-cleaning", since its "plow-shaped nose" is adapted to thrust particles (dirt, etc.) to one side.

Figure 12A:
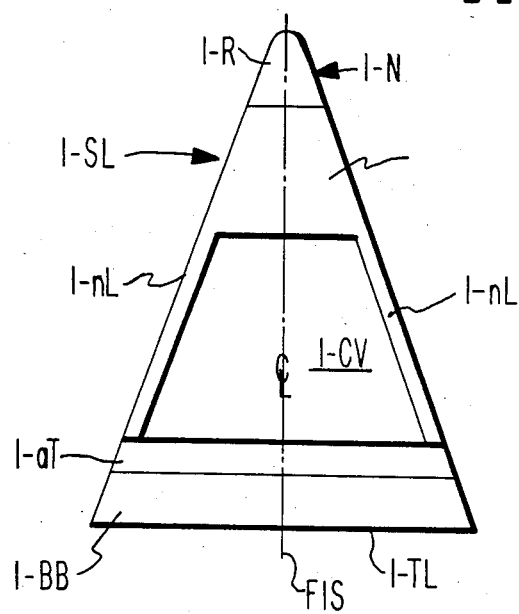
FIG. 12-A is an enlarged plan view of a like slider, shown in side view on FIG. 12-B, in associated plan view if FIG. 13-A and end-view in FIG. 13-B, with a like plan view in FIG. 14-B and idealized pressure profile across some portions thereof plotted in FIG. 14-A.
Figure 12B:
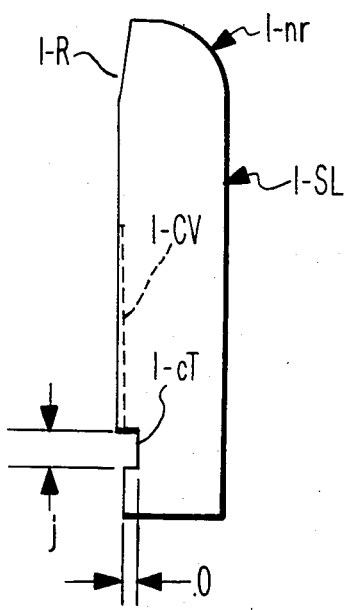

A particularly preferred version of such a delta slider is shown in FIG. 12A in plan view as delta slider 1-SL, in associated side view in FIG. 12B and in similar plan view in FIG. 13A with a schematic end view in FIG. 13B showing the transducer means mounted on the tail.

Thus, slider 1-SL has a ramp means 1-R across its forward air bearing surface ("ABS"), terminating in a nose portion 1-N which is somewhat pointed as illustrated (the ramp section being relatively conventional as known by workers, both in structure and in function). A positive pressure pad ABS 1-PD is provided just aft of ramp 1-R. A negative pressure cavity 1-CV is disposed aft of pad 1-PD, and is defined laterally by a pair of thin rail means 1-RL.

A back bar arrangement preferably terminates this structure with a back bar slot 1-CT just aft of cavity 1-CV (and adapted to "purge" 1-CV), with the other side of slot 1-CT defined by a back bar member ABS 1-PB presenting a tail edge 1-TL on which transducer means are mounted (e.g., about five as shown schematically in FIG. 13B). Of course, features like the Back-bar/slot, ramp, etc. are not always necessary for a Delta slider, as workers will perceive.

The slider material may be made of any known "slider material" as known in the art; for instance, a ceramic like Sumitomo No. SCS-AC2 (by Sumitomo Co.) which, as finished, in the illustrated form may be the order of 0.150 to 0.160" long by about 0.120 to 0.130" wide at tail 1-TL and about 0.034" high with cavity 1-CV for instance being 350 to 400 $\mu$-in. deep and slot 1-CT being the order of 0.004" deep by about 0.010" wide. Rail walls 1-RL will be kept thin (e.g., about 0.005"). The angle of divergence of the sides (see AA angle, FIG. 10A) may be the order of 20° to 22°.

RESULTS

Figure 15:
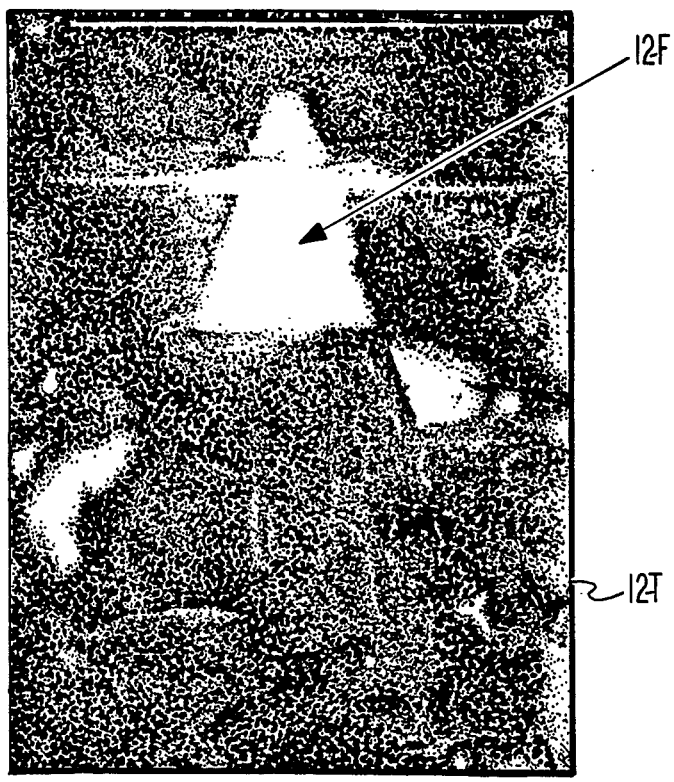
FIG. 15 reproduces a photograph of a Delta slider flying over a (transparent) disk.

Workers will be surprised at how clean, nimble, stable and effective a slider such as 1-SL can be in operation. For instance, FIG. 15 is a photograph taken of such a delta slider flying above a glass disk (photographed from under the disk) with the forward area 12-A flying at about 14 $\mu$-in. and the tail area at 12-T flying at about 2 $\mu$-in. in very stable condition.

One reason for the great stability and particularly strong resistance to roll is presented in the analysis summarized by FIG. 14A, a plotting of ideal pressure profiles for a slider air bearing like 1-SL, illustrated in associated FIG. 14B. Here, it will be understood that the positive pressure thrusting the slider away from the medium is principally exerted by the "front pad" 1-PD and to a lesser degree by the aft ABS, or "rear pad" (including back bar 1-PB and rails 1-RL flanking cavity 1-CV). This "rear pad" ABS pressure profile will be seen as presenting minor peaks $P_K$, $P_K'$, determined principally by the additive function of rails 1-RL. These positive pressures will be understood as resisted by the oppositely urging negative pressures of cavity 1-CV (see "cavity" in the profile plot).

TABLE B

Some novel features of this delta slider (ABS) appear to be:

1. CLEAN: A triangular or "Delta" shape (in plan-cross-section) together with a properly pitched flying attitude (leading edge flies at greater height than trailing edge above media) appears to give this design a particular self-cleaning aspect. Any dirt particles encountered (at head-disk interface) will likely be deflected to either side of the slider.

Figure 2:
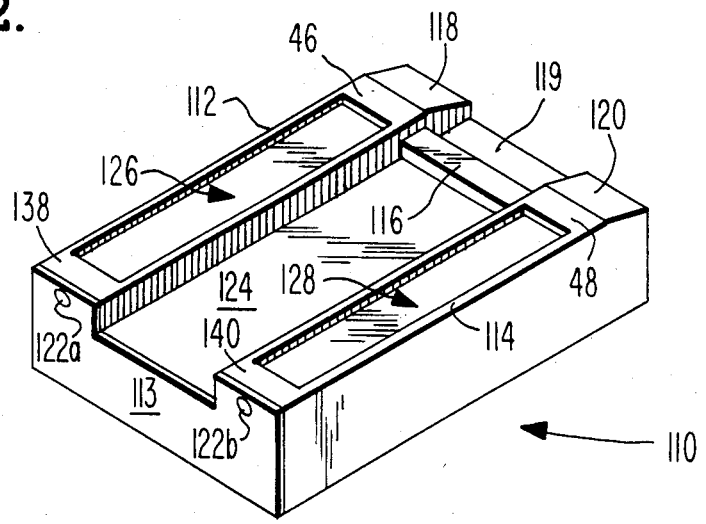

2. STABLE: The slider is supported as it flies on the medium by three main pressure points (see discussion re FIG. 11A above) with consequent great improvement in slider stability, especially in the lateral direction (vs. roll) . . . e.g. vs. "4-point pressure profile in FIG. 3, for slider in FIG. 2".

Thus, as opposed to a conventional "rectangular profile" slider (as slider 20 in FIG. 1), there is virtual complete elimination of "wobble" tendencies (i.e., a lateral "seeking" of a plane of stabilization while flying, with associated oscillation back and forth in the roll direction, e.g., when one rail ABS 1-RL is not exactly coplanar with the other). Radical reduction of rail ABS area helps to provide this stability too.

2A. SELF-RIGHTING: Pitch attitude of such a delta slider should be largely determined by the pressure differential under the leading pad ABS (1-PD) vs. that of the trailing edge ABS (1-TE)—the size of the leading pad 1-PD is probably a significant factor determining the air bearing pressure attained (here a pitch of about 80 to 90 micro-radians is assumed).

As long as the air bearing surface adjacent the trailing edge is sufficiently flat, the pressure peaks near the edges of the slider should be relatively equal (see FIG. 12, peaks $P_K$, $P_K'$); this balance of forces will tend to keep the plane of the air bearing surfaces ABS parallel to the plane of the passing disk.

Further, the fact that the forward pad 1-PD has a reduced-length lateral "lever arm" significantly reduces roll tendencies. The pressure peak on this leading pad will be centered on the slider's center line. If the plane of leading pad 1-PD is different than the plane of the trailing pad, then leading pad 1-PD will tend to exert a roll force on the slider. This is indicated schematically in FIG. 16 where the large force $F_1$ on the leading pad is directed symmetrically on the pad, that is on the center line of the slider. Since there is only one force applied to this pad, there is very little (other than the spatial extent of the force) to affect the orientation of the pad with respect to the disk. The trailing pad, however, has a relatively uniform support along the entire slider width; and this tends to keep its ABS parallel to the disk surface. Since the moment arm of the leading pad tending to roll the slider is so small, the overall roll forces will always be much reduced and relatively trivial and the slider will typically tend to return to its "no-roll" equilibrium state even when perturbed (a "self-righting" characteristic).

2B. EDGE-FORCES BALANCED: Workers will understand that as this Delta ABS rushes across a disk (or other flat) surface, very very close thereto, a type of "exhaust" is commonly thrown-up about its sides from air escaping the entrapment induced by "wedging" between the up-pitched slider and the passing record. Such "exhaust" can readily tip a slider ABS to one side (undesired roll) and upset stability. A Delta slider ABS is desensitized to such exhaust-induced roll and related instabilities. Also, the simple "cuneiform" ABS shape makes it much easier for a worker to ascertain the magnitude of such lateral forces.

Also, a "Delta ABS" is more stable under low transport velocities (e.g., flying a few u" above a $3\frac{1}{2}''$ or $5\frac{1}{4}''$ disk at low rpm—cf over sputtered recording surface.

3. NIMBLE: Such a delta slider seems to have interesting compliance features that make it more forgiving of media imperfection (e.g., surface asperities), being lighter and more nimble in dodging-around such surface discontinuities (this also results from its three point pressure contact as well as its somewhat pointed nose and reduction in forward ABS area in the lateral direction (i.e., "forward attentuation" or "pointing").

Figure 20:
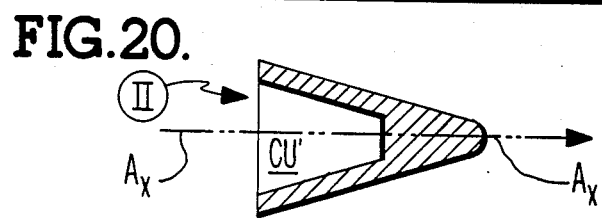
FIGS. 20/21 show respective modified Delta sliders very schematically and in plan view.

ALTERNATIVE STRUCTURES

Where the Delta ABS preferably is somewhat pointed at its leading edge (cf ramp R, FIG. 11), it may merely be snub-nosed in appropriate cases (e.g., see slider II, FIG. 20). Likewise, where the back-bar/slot feature and/or the ramp are not needed, these can be eliminated (see FIG. 20 also, where Delta slider II is like slider I in FIG. 11 except for eliminating ramp and back bar/slot, and exhibiting a relatively blunt nose).

Figure 21:
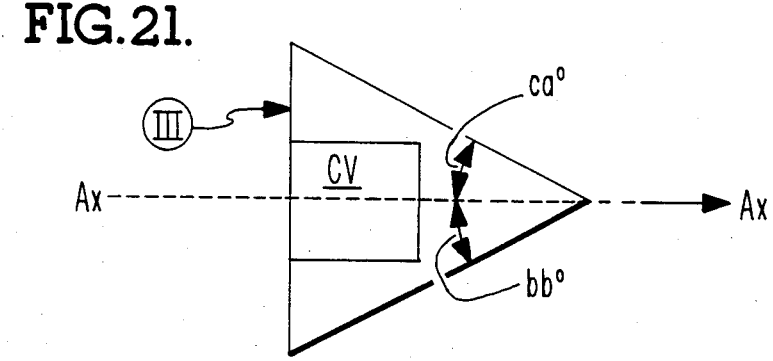

Also, where symmetry of the ABS about center axis ($A_x$—$A_x$ FIG. 20) is commonly desired, in some instances it may not be. For instance, one may orient the ABS sides at different angles; e.g., to nullify unequal "exhaust" or like lateral forces. Thus, FIG. 21 shows a Delta ABS like II in FIG. 20 except that one side diverges from its center axis $A_x$—$A_x$ at about 24° (aa°) (vs. larger side-thrust on ABS) while the other diverges at about 24° (bb°). Likewise, the size and orientation/shape of the side rails flanking cavity CV may be modified. Also, one could adapt this delta ABS for a non-self-loading slider (cf where the cavity CV has the blocking wall on its forward section pierced or removed), though, as usual, such must be downward urged for proper loading.

MANUFACTURING METHODS

Figure 18:
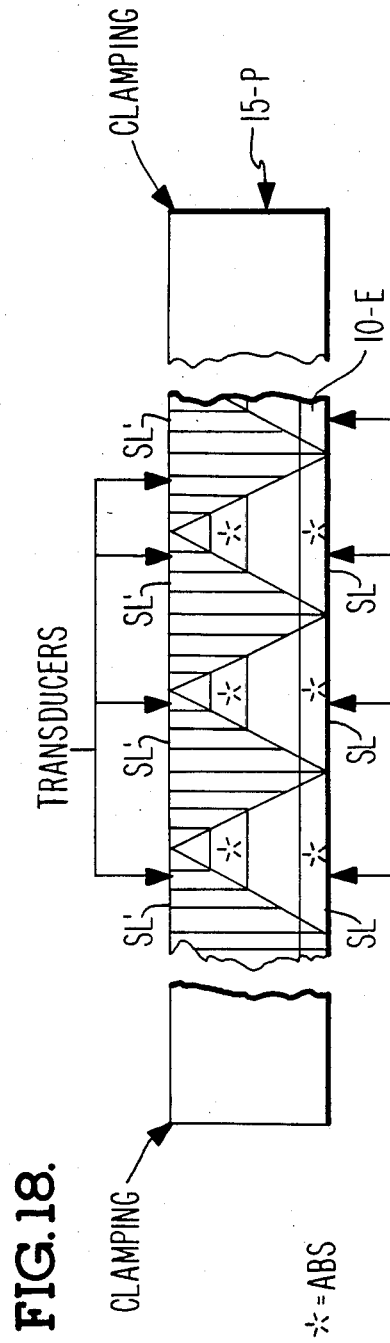
Figure 19:
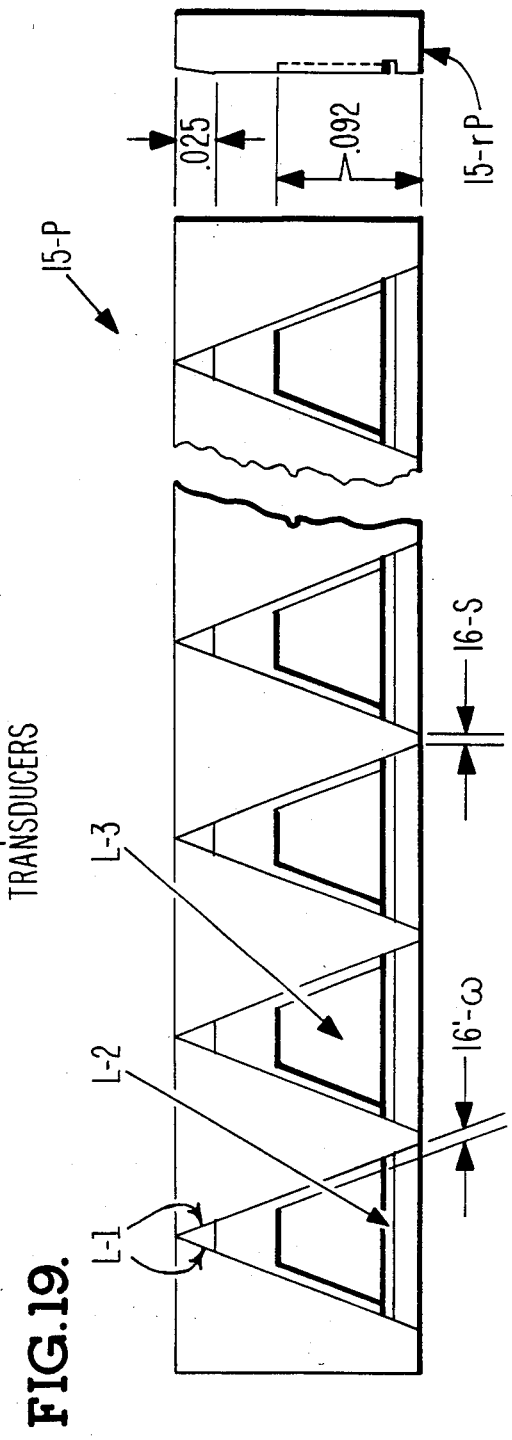

A delta slider (e.g., like slider 1-SL discussed above) presents a number of attractive manufacturing features as well. For instance, when using typical slider production techniques, one may expect about twice the yield from a given workpiece, with little or no significant increase in manufacturing time or costs. This is a very significant advantage of course as workers will acknowledge. It is somewhat schematically illustrated in FIG. 15 where a first linear array of delta sliders SL will be seen as formed by common treatment steps on a single multi-slider workpiece 15-P (see FIGS. 17-19), being first formed there and later cut-out or sliced away (diced). Where sliders SL (e.g., rectangular) might conventionally be formed from 15-P, the "delta" configuration facilitates doubling the yield approximately, to also form sliders SL', for example. That is, a second identical set of sliders SL' is likewise formed in the interstices between primary sliders SL; these second sliders SL' however are faced in the opposite direction so that their air bearing surfaces ABS are on the opposite side of this plan view.

According to known techniques, such a work-piece 15-P may be clamped at both ends, and an array of transducers for each slider set formed along the appropriate edge (that is lower edge 15-E for sliders SL and the opposite side, and upper edge for transducers of the second slider set SL'). Work-piece 15-P may comprise a three inch thick wafer with the thin film heads deposited on these edges, and with both sides being sputtered and electroplated simultaneously, or at least at the same station, thus reducing the process time by about one-half. Both sides of the wafer would thus be masked (resist deposition and removal in common), washed, cleaned and annealed together, etc; these being performed on both sides of the wafer at the same station (and possibly simultaneously). Then the two slider sets SL, SL' could be cut away for the finished form, yielding approximately twice the number of sliders for little more than essentially the same processing time and trouble-expense.

Workers will be particularly attracted to this feature of "delta sliders", especially the possibility of forming two sets of sliders together, with associated transducers deposited on both sides of the wafer.

Automatic laser machining or ion etching may be used to conveniently define the air bearing geometry.

Figure 16:
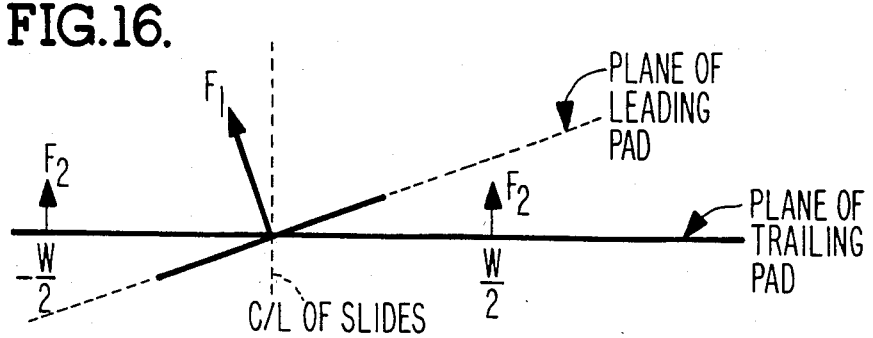
FIG. 16 idealizedly relates the orientation of pressure pads on a Delta slider.

One may typically find that the leading ABS pad and the trailing ABS pad need not be coplanar in all instances (vs. 4-point pressure profile, as FIG. 3 which requires co-planarity)—one other advantage of the 3-point pressure profile of a Delta slider (see also FIG. 16). "Imperfect flatness" of the leading pad may not be significant in affecting Delta slider attitude or stability—the 3-point pressure profile is more tolerant of changes in such.

Special fixturing and transfer tooling would of course be advisable. Also, it might not be feasible to attempt to obtain a precise alignment of the "zero-throat" line on both sides of the substrate—thus, it may be prudent to orient the masks on the "second side" of the workpiece 180° from those on the front side, even where trying to maintain alignment as close as possible. Thus, it is necessary to have access to both cut surfaces on the workpiece as each surface will be machined to form ABS pads, though one need not perform these operations simultaneously. After the sliders are cut from the workpiece, each slider can be marked on a bar-by-bar basis using the negative force cavity 1-CV surface as a reference.

Figure 17:
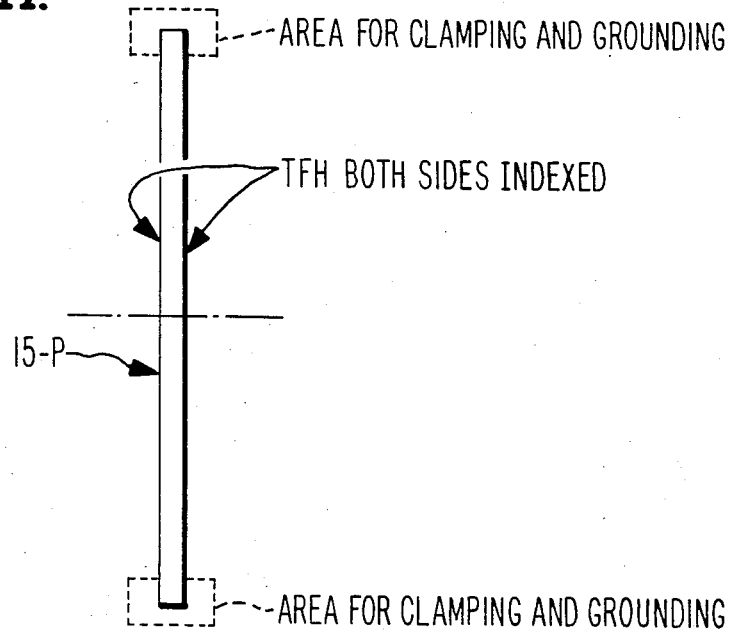
FIG. 17 very schematically shows a multi-slider workpiece in side view; this shown in idealized fragmentary plan view in FIGS. 18 and 19.

FIG. 17 shows a side view of such a workpiece 15-P as described above, clamped top and bottom, while FIG. 19 shows in plan view somewhat greater detail of such a workpiece 15-P. For instance, with a tail-spacing 16-S of about 12 mils one may typically laser-etch an outline each of the sliders (cf step L-1) about 315±100 $\mu$-in. One may also laser etch the back bar channel (cf step L-2), e.g., about 4 mils deep. One may also laser etch the center cavity 1-CV (cf. step L-3), e.g., about 350±50 $\mu$-in. deep.

Thus, in summary workers will appreciate that there has been described a novel "delta slider" and associated advantageous manufacturing techniques and that these involve a number of surprising features and advantages, such as those above mentioned.

For instance, such a low mass delta slider is appropriate for use on some state of the art disk drive units. The slider may in some cases even be mounted on conventional support mechanisms such as the "Watrous flexure-load beam" or like flexure-spring cantilever. Such a light slider will exhibit less momentum and be more nimble, thus more readily negotiating a nodule on a disk surface without being destabilized, etc. thereby. Reduced mass will also increase the slider's natural frequency.

The delta slider forms an advantageous "zero load" (or negative load) air bearing member and as such it may be appropriate for a wide range of implementations (e.g., 3.5 in. to 14 in. disks); varying head-disk velocities (e.g., from 500 to 2500 ips) and even for use as a "launched" head in a disk drive unit.

And where the back bar is used it is conducive to the placement of a plurality of read/write transducers on the device.

The "three point" medium-contact feature will provide greater stability and less tendency to roll.

Dust particles and the like can be more readily negotiated and/or diverted out of the slider path by the light slider and its pointed nose. And, the pointed nose should slice through the air with less disturbance and oscillation.

Manufacturing advantages have also been mentioned such as the fact that approximately twice the number of sliders and associated thin film heads can be produced on a given wafer (both sides) with a consequent reduction in wafer cost and processing steps (e.g., heads electroplated in a single step).

Operating with the mentioned slider embodiment (cf. disk velocity of 1508 in/sec; positive pressure rails 15 mil wide and 500 u-inch negative air-pressure cavity), an escape passage 23 as in FIGS. 4–6 and 10×4 mils in cross section (for a flying height of 5 to 7 u-inch under the back-bar) increased bearing stiffness (e.g., by about 10%), gave better control and less "roll", while reducing "pitch angle" (e.g., from 130 u-radians to 90 u-radians).

It will be understood that the preferred embodiments described herein are only exemplary, and that the invention is capable of many modifications and variations in construction, arrangement and use without departing from the spirit of the invention.

Workers will appreciate that such "Delta ABS" features are apt for use with negative pressure type sliders which fly at less than 10 u" (as is back bar). Workers will also appreciate that, in appropriate instances, one may alternatively use such design (e.g., and back bar/-purge channel) with low flying, positive-pressure or zero-pressure (Winchester) sliders.

Further modifications of the invention are also possible. For example, the means and methods disclosed herein are also applicable for flying Delta ABS over other record surfaces. Also, the present invention is applicable for providing a precision-flying ABS in association with other forms of low-mass recording and/or reproducing systems, such as those in which data is recorded and reproduced optically.

The above examples of possible variations of the present invention are merely illustrative. Accordingly, the present invention is to be considered as including all possible modifications and variations coming within the scope of the invention as defined by the appended claims.

What is claimed is:

1. A method of fabricating a "Delta slider" means for flying a magnetic head on a fluid bearing relative to magnetic recording media moving in a predetermined direction in the fluid, this slider means comprising:

a slider body having means defining a wedge-shaped fluid bearing surface having leading and trailing edges for flying above the moving media, the fluid bearing surface defining means comprising:

a generally cuneiform planar fluid support surface FSS, the method including:

providing a rectangular bar of slider material, this bar including a pair of elongate planar parallel "top" and "bottom" faces defined between opposing parallel sides;

forming a row of identical relatively adjacent triangular slider pieces, including forming air bearing surfaces and associated cavities and other elements in common, the sliders being disposed in alternating reversed juxtaposition along the row; and severing the sliders so formed from the bar.

2. The combination as recited in claim 1, wherein identical arrays of thin film transducers are formed, in common, along each slider base before severing.

3. The combination as recited in claim 2, wherein the sliders are defined and their elements so formed in common so as to be juxtaposed in alternating face-up/bottom-up relation, wherein an adjacent slider is up-ended and also face reversed, whereby every even number slider ABS faces up on one bar face while every odd number slider ABS faces up on the opposite bar face.

4. The combination as recited in claim 3, wherein a row of self-loading Delta sliders are so formed in common, with each ABS including a negative-pressure cavity.

5. The combination as recited in claim 4, wherein the ABS cavities and convergent sides of each slider are defined by laser means.

6. A method of fabricating a number of idential magnetic recording Delta sliders in common, including the steps of:
providing an elongate bar of slider material having a pair of parallel elongate edges and a pair of parallel elongate opposed top and bottom faces lying between these edges;
defining at least one row of said sliders on at least one bar-face with adjacent sliders being defined in up-ended relation so that a first slider presents its trailing edge along a first bar edge, and the adjacent slider presents its trailing edge along the opposite bar edge, etc;
depositing identical sets of thin film transducers along each bar edge, one set along the trailing edge of each slider;
forming the rest of the slider elements in common on the bar; and
severing the so-formed sliders.

7. The combination as recited in claim 6, where each slider row is arranged to present adjacent slider air bearing surfaces (ABS) on opposite bar-faces.

8. The combination as recited in claim 7, where the sliders are so defined and separated in common by laser cutting means.

9. The combination as recited in claim 8, wherein a like negative-pressure cavity is formed on each slider ABS, to thus produce self-loading sliders.

10. The combination as recited in claim 9, wherein the thin film transducers are deposited along both slider faces.

* * * * *